June 22, 1965 J. H. BERTIN ETAL 3,190,235
VEHICLES ASSOCIATED TO A GUIDING TRACK
Filed June 17, 1963 2 Sheets-Sheet 1
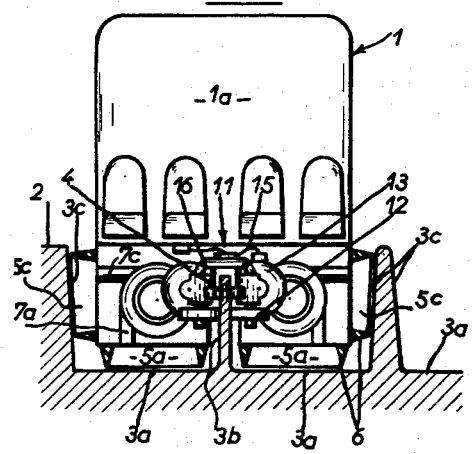
Fig.:1
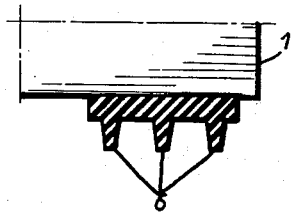
Fig.:4
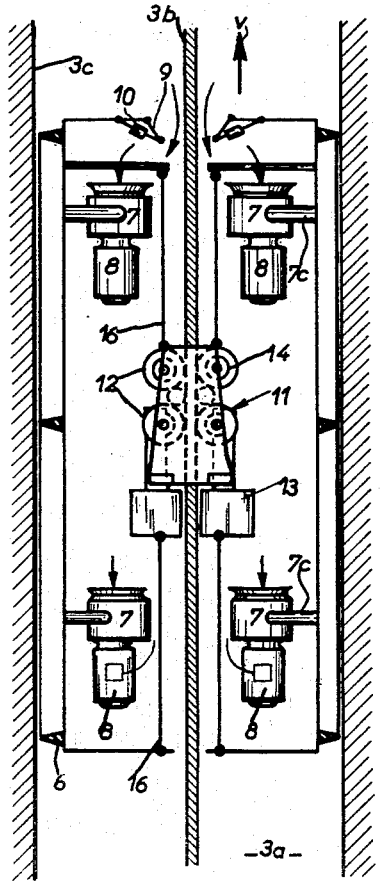
Fig.: 2
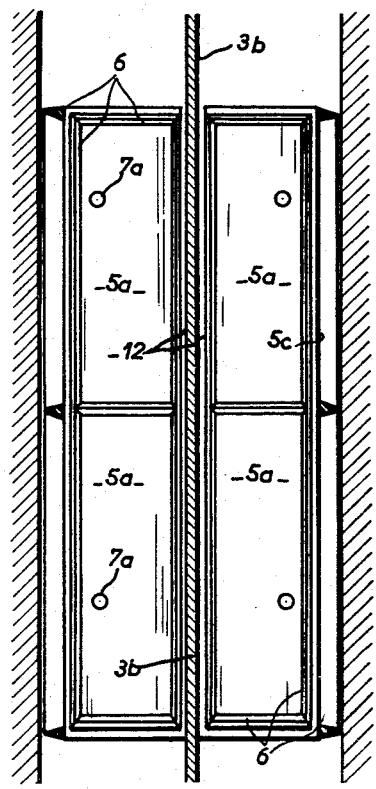
Fig.:3
INVENTORS
Jean Henri Bertin,
Paul Guienne
BY
Stevens, Davis, Miller & Mosher
ATTORNEYS

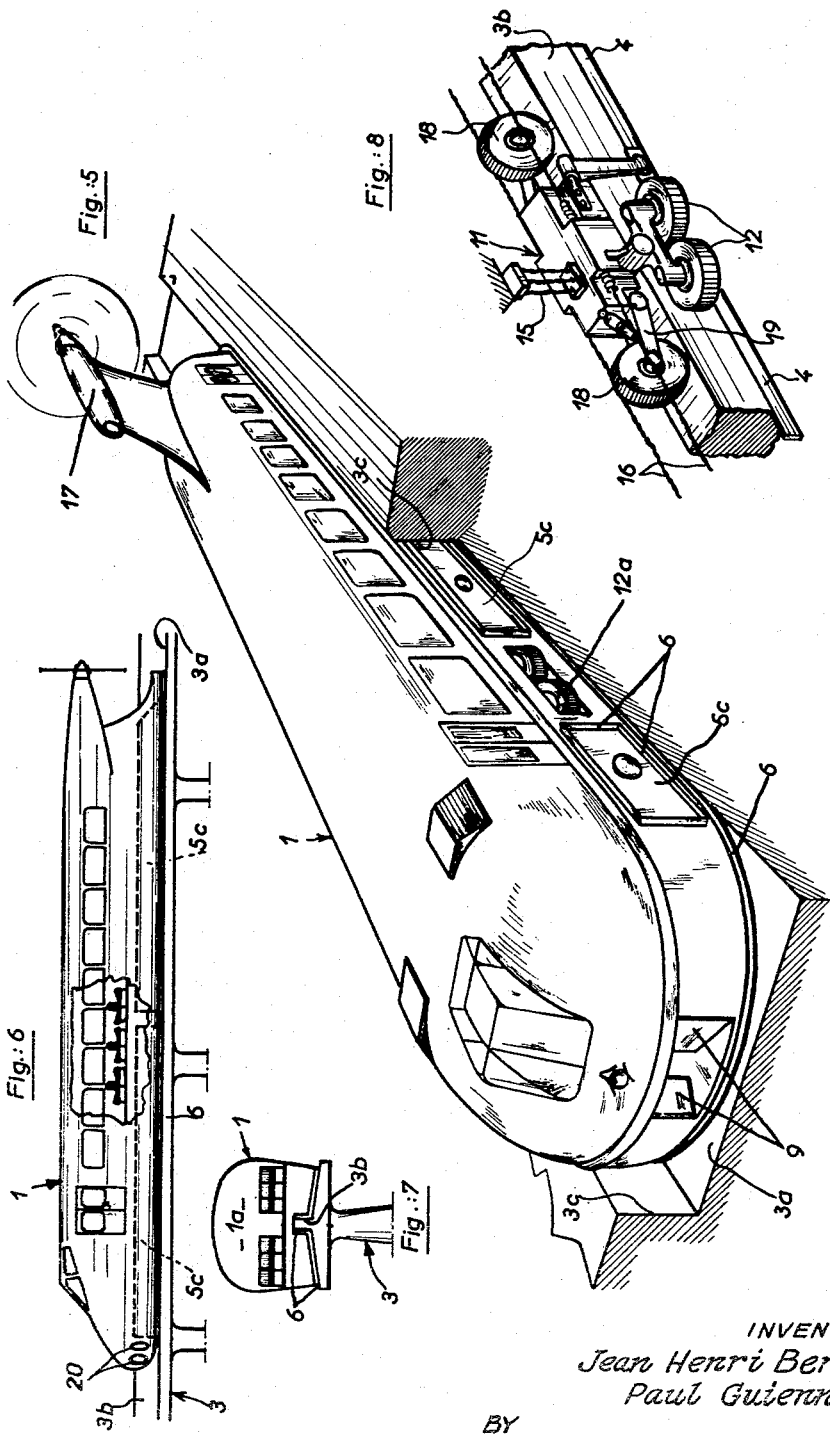

United States Patent Office 3,190,235
Patented June 22, 1965

3,190,235
VEHICLES ASSOCIATED TO A GUIDING TRACK
Jean Henri Bertin, Neuilly-sur-Seine, and Paul Guienne, Paris, France, assignors to Société Bertin & Cie, Paris, France, a company of France
Filed June 17, 1963, Ser. No. 288,386
Claims priority, application France, June 26, 1962, 901,981
8 Claims. (Cl. 104—134)

This invention relates to vehicles such as transportation wagons which travel along a highly elaborate ground structure providing guidance and suspension. Its aim is to notably increase their comfort as well as their ease of construction.

Such vehicles are essentially characterized by the necessary precision of guidance, which heretofore has been achieved by means of metal wheels which were recently replaced by wheels equipped with inflatable tires. The contact area on which each wheel bears against the associated track is small and the contact pressure consequently is at least relatively high. This fact, even when multiple wheels are used, makes the vehicle sensitive to local imperfections of the track and reduces its comfort; at the same time, construction of such vehicles is consequently complicated.

The present invention takes advantage of the natural properties of air-cushion platforms in which the cushions are bounded by a seal including at least one deformable lip: namely their relatively great "stiffness" (i.e., the large increase in load required for a given platform depression), in conjunction with their insensitivity to local obstacles, to utilize a plurality of air cushions of this type for both guidance and suspension of a vehicle. Passenger comfort is distinctly improved by the resulting stability and virtually complete absence of vibration, while the structure of the vehicle can be substantially lightened and simplified, since both the load and the suspension system are equally distributed over almost the entire horizontal surface of the vehicle. Furthermore, the guiding cushions preferably occupy a large portion of the lateral area of the vehicle facing the guiding surfaces of the track.

It is in fact possible to adjust the pressures and stiffnesses of the guiding cushions independently of those of the lift cushions supporting the weight of the vehicle, even when the same compressor supplies a lift cushion and a guidance cushion.

In addition, the invention preferably combines several deformable-seal cushions with at least one driving bogie having opposed wheels located, for instance, on either side of a traction rail that possibly serves also to carry electric current. This bogie is attached to the body of the vehicle through longitudinally disposed members such as traction cables or the like, as well as through linkages or cables of any convenient type serving for controlling the bogie. For certain specific forms of utilization such as high-speed transportation, the bogie can be caused to cease to operate beyond a certain speed and can even be dispensed with by using aerodynamic propulsion means such as a propeller or a turbojet.

All the essential heavy parts of the vehicle, to wit the traction motors, the wheels forming the bogie or bogies, the motors and compressors supplying the air cushions, and the skids or multiple rollers adapted to support and/or guide the vehicle when it is stationary or even to brake it, can easily be grouped together in the base thereof, thereby increasing the stability of a relatively light body, to which flush access from the station platforms remains easy.

The description which follows with reference to the accompanying drawings, which are filed by way of non-limitative examples, will give a clear understanding of the various features of the invention and of the art of carrying them into practice.

Referring to the drawings filed herewith:

FIGURES 1 to 3 schematically illustrate an embodiment of a vehicle according to the invention, respectively in cross-section, horizontal section and viewed from beneath;

FIGURE 4 shows in schematic cross-section a deformable seal with multiple lips;

FIGURE 5 is a schematic overall perspective view of an alternative embodiment of the vehicle associated with a recessed track and capable of high speeds;

FIGURES 6 and 7 show respectively in side elevation and cross-section another alternative embodiment adapted for high speeds and associated to a raised track; and FIGURE 8 shows in perspective an improved bogie according to this invention.

Referring first mainly to FIGURES 1 to 3, and 5 to 7, there is shown thereon a passenger vehicle 1 constructed in accordance with this invention. The cabin 1a is located above the level of the station platforms designated by numeral 2 and associated with a track 3.

Said track consists, on FIGS. 1 to 3 for example, of a trench the bottom of which forms two substantially horizontal bearing surfaces 3a separated by a central partition of low height having two substantially vertical surfaces 3b, which partition is positioned between said horizontal surfaces and serves as a propulsion rail. Said track further includes two guiding surfaces 3c forming the edges of the trench. All the portions referred to can be made of light sheet metal or of as-cast concrete. The surfaces 3b can additionally support rails 4 for leading in and returning the electric current.

When it is moving, the vehicle is supported on a plurality of bearing cushions 5a arranged in at least two rows each of which consists of at least two cushions, whereby to ensure longitudinal and transverse stability. Said cushions are bounded by strips 6 of some deformable material such as rubber or plastic, the cross-section of which is preferably trapezium-shaped, and a multiplicity of such strips can be provided as shown in FIGURE 4. This permits of a very low ground clearance with respect to the perimeters of the various cushions, thereby reducing the expenditure of energy required for lift. Guiding cushions 5c of the same type and numbering at least four are independently supplied in the same manner as the bearing cushions 5a, for instance by means of compressors 7 each of which is driven by an electric motor 8 and provided with two outlet ducts 7a and 7c which respectively have ports in bearing cushions 5a and 5c.

It goes without saying that the method of supplying the cushions independently, shown on the drawing, can likewise be implemented by means of multiple ejectors respectively associated with the various cushions but fed by a single inductive gas flow generator. Indeed, such an ejector is for all practical purposes insensitive to pressure variations in the cushions adjacent the cushion it supplies, such variations being negligible in relation to the natural expansion of the inductive gas flow. Cushions having different functions (bearing and lifting) can nonetheless be supplied in parallel without departing from the scope of the invention.

Advantage can likewise be taken of the dynamic overpressure prevailing ahead of the vehicle by reason of the forward speed $v$, to reduce the power of motors 8. To this end, inlet means for compressors feeding air cushions with pressurized air have ports in the front end wall of the vehicle hull. These inlet means are, for instance, constituted by an air gate for a common machine room which contains the air compressors and from which air is drawn for feeding cushions 5a and 5c. Pivoted flaps 9c, controlled by any actuating device known in the aircraft engine air intake art, advantageously are used for adjusting the pressure in said machine room (see FIG. 2). Obviously, the various compressors 7 can be provided with individual air inlet ducts. Since the cushion supply pressure is low (approximately 10 to 50 centimeters of water), a notable saving in power is achieved and it is even possible to envisage stopping the lift motors when the speed of translation and, with it, the dynamic air pressure ahead of the vehicle are high enough.

In any event at moderate speeds, braking and possibly also traction are achieved by means of at least one bogie 11 which embraces the central rail, on each side 3b of which are disposed wheels 12 the adhesion of said wheels being thus independent of the weight of the vehicle. Said wheels are equipped with brakes 14 and a number of them at least are driven by electric motors 13. The bogie 11 can rest on an upper face of the central rail, through wheels associated with a suitable suspension system.

Excluding the various control and electric supply cables 15, the connection between bogie 11 and the vehicle is preferably effected solely in the fore-aft direction, thus ensuring that propulsion or braking forces are transmitted independently of transverse and/or vertical disturbing forces. A simple way of achieving such a connection consists of securing to said bogie 11 at least one cable 16 attached to the vehicle body at both ends. It will of course be understood that plain or ball-jointed links can be used instead of cable 16, possibly in conjunction with suitable elements for damping sudden loads, such as result from motor switching operations. Passenger comfort is thus increased, since, for all practical purposes, no vibration is transmitted to the bodywork. In addition, the latter can be of very light construction, thereby leading to improved performance.

A great many alternative methods of construction can obviously be based on this preferred embodiment. By way of example and as shown in FIGURE 5, it would be feasible to dispense with a central rail but retain the possibility of exerting longitudinal forces greatly exceeding the weight of the vehicle, particularly for braking purposes, by disposing the opposed wheels 12a of a bogie against the opposed substantially vertical faces 3c of the track.

Alternatively, the cushions 5c could be disposed on either side of a central rail, against the faces 3b thereof, as shown in FIGURES 6 and 7. The vehicle illustrated respectively in side elevation and cross-section on these figures is similar to that of FIGURE 5 (being adapted to high speeds of up to 400 kilometers per hour), except that the track supporting it is raised instead of being recessed, thereby facilitating its construction. The central rail can with advantage serve for several uses and ensure not only guidance of the vehicle but also support for a bogie, as shown in FIGURE 8. Such a bogie is equipped with front and rear supporting wheels 18 associated with suspension means 19, in addition to lateral wheels 12 used for braking and possibly also for propelling the vehicle at low speeds at least. It will also be noted that the compressors supplying the air cushions have entirely distinct inlet ducts 20 running back from the forward end of the vehicle, whereby to utilize the dynamic pressure.

The use of electric motors for drive and lift, though of advantage in the case of urban transportation, require costly supporting facilities. It can therefore be preferable to replace at least some of the motors by internal combustion engines, or even by gas turbines 17 for providing aerodynamic propulsion by propellers or jet reaction, in the case of vehicles travelling at high speed over long distances. On the other hand, propellers driven by electric motors can be used if desired.

What is claimed is:
1. A trackway transportation system comprising a horizontally extending track having in cross section flat and substantially horizontal bearing wall portions and flat, substantially vertical guiding wall portions of opposite orientations; a vehicle having a hull, front end and rear end elongated seals made of deformable material such as rubber and plastic externally supported by said hull, and defining therewith at least two flattened plenum chambers facing each of said guiding and bearing track wall portions, pump means aboard of said vehicle for independently supplying with pressurized fluid the plenum chambers facing said bearing and guiding track wall portions, respectively; and propulsive means for moving said vehicle along said track.

2. A trackway transportation system according to claim 1 wherein said pump means independently supplying the plenum chambers respectively facing said bearing and guiding track wall portions are separate motor-compressor sets.

3. A trackway transportation system according to claim 1 wherein at least one of said pump means is further equipped with outlet ducts feeding the plenum chambers respectively facing a bearing and guiding wall portions, for simultaneously feeding both said plenum chambers.

4. A trackway transportation system according to claim 1 wherein said pump means are equipped with inlet means located at the front end of said vehicle whereby to supply said plenum chambers with air taken from directly ahead of the vehicle while it is moving.

5. A trackway transportation system according to claim 1 wherein said vehicle is equipped with a motive bogie connected by substantially longitudinal tension members to the front and rear end of said hull, said bogie comprising in a manner known per se vertical-shafted motive wheels bearing against said substantially vertical wall portions of opposite orientations.

6. A trackway transportation system according to claim 5 wherein said track has a general U shape cross section and further comprising a median vertical rail with which cooperates said motive bogie.

7. A trackway transportation system comprising a horizontally extending track, said track having in cross section a general U shape, two flat and substantially horizontal bearing wall portions and two flat and substantially vertical guiding wall portions of opposite orientations; a vehicle having a hull; elongated seals made of deformable material such as rubber and plastic externally supported by said hull, and defining therewith at least two flattened plenum chambers facing each of said guiding and bearing track wall portions, said two plenum chambers being at least substantiallly aligned parallel to the track general direction; pump means aboard of said vehicle for independently supplying with pressurized fluid the plenum chambers facing said bearing and guiding track wall portions, respectively; and propulsive means for moving said vehicle along said track.

8. A trackway transportation system comprising a horizontally extending track, said track having in cross section a generally inverted T shape, two flat substantially horizontal bearing wall portions and two flat substantially vertical guiding wall portions of opposite orientations; a vehicle having a hull; elongated seals made of deformable material such as rubber and plastic externally supported by said hull, and defining therewith at least two flattened plenum chambers facing each of said guiding and bearing track wall portions, said two plenum chambers being at least substantially aligned parallel to the track general direction; pump means aboard of said vehicle for independently supplying with pressurized fluid the plenum chambers facing said bearing and guiding track wall portions, respectively; and propulsive means for moving said vehicle along said track.

(References on following page)

References Cited by the Examiner

UNITED STATES PATENTS

| | | | |
|---|---|---|---|
| 1,053,368 | 2/13 | Eells | 104—155 |
| 1,396,627 | 11/21 | Denham | 105—30 |
| 1,727,720 | 9/29 | Kruckenberg. | |
| 2,864,318 | 12/58 | Toulmin | 104—134 X |
| 3,013,505 | 12/61 | Burke | 104—134 |
| 3,055,312 | 9/62 | Jay et al. | 104—134 |
| 3,096,728 | 7/63 | Amann et al. | 104—134 |
| 3,119,349 | 1/64 | Hampton et al. | 104—134 X |

MILTON BUCHLER, *Primary Examiner.*

LEO QUACKENBUSH, *Examiner.*